United States Patent
Dellock et al.

(10) Patent No.: US 9,604,567 B1
(45) Date of Patent: Mar. 28, 2017

(54) LUMINESCENT TRAILER HITCH PLUG

(71) Applicant: Ford Global Technologies, LLC, Dearborn, MI (US)

(72) Inventors: Paul Kenneth Dellock, Northville, MI (US); David Brian Glickman, Southfield, MI (US); Stuart C. Salter, White Lake, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/182,811

(22) Filed: Jun. 15, 2016

(51) Int. Cl.
| | | |
|---|---|---|
| *B60Q 1/00* | (2006.01) | |
| *B60Q 3/00* | (2006.01) | |
| *B60Q 1/30* | (2006.01) | |
| *B60D 1/64* | (2006.01) | |
| *B60Q 1/56* | (2006.01) | |

(52) U.S. Cl.
CPC .............. *B60Q 1/305* (2013.01); *B60D 1/64* (2013.01); *B60Q 1/56* (2013.01)

(58) Field of Classification Search
CPC ............. B60D 1/64; B60Q 1/305; B60Q 1/56
USPC .................................................. 362/485, 488
See application file for complete search history.

(56) References Cited

U.S. PATENT DOCUMENTS

| | | |
|---|---|---|
| 4,054,302 A | 10/1977 | Campbell |
| 5,709,453 A | 1/1998 | Krent et al. |
| 5,927,229 A | 7/1999 | Karr, Jr. |
| 6,031,511 A | 2/2000 | DeLuca et al. |
| 6,117,362 A | 9/2000 | Yen et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,910,705 B1 | 6/2005 | Harwood et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

A trailer hitch plug is provided herein. A base member is configured to luminesce in response to excitation light provided by a light source. An electrical connector is provided at the base member. A cover is removably coupled to the electrical connector and configured to luminesce in response to excitation light provided by the light source.

20 Claims, 6 Drawing Sheets

(56) References Cited

U.S. PATENT DOCUMENTS

| | | |
|---|---|---|
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0057361 A1 | 3/2012 | Corliss |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335988 A1 | 12/2013 | Rotenberg et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

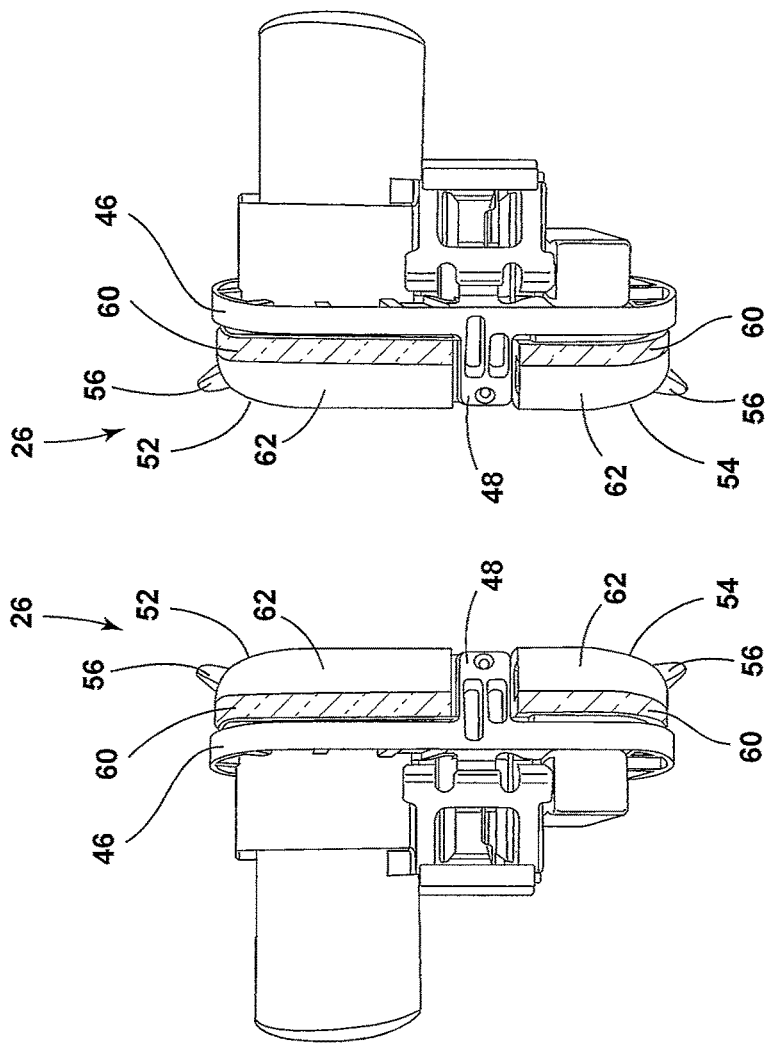
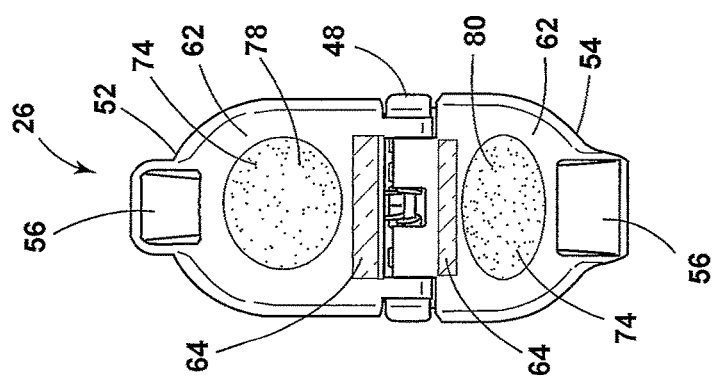
FIG. 7
FIG. 6
FIG. 5

LUMINESCENT TRAILER HITCH PLUG

FIELD OF THE INVENTION

The present invention generally relates to trailer hitch plugs, and more particularly, to trailer hitch plugs configured to illuminate.

BACKGROUND OF THE INVENTION

Tow vehicles are equipped with trailer hitch plugs to allow an electrical connection to be made between the vehicle and a trailer. By virtue of its location relative the vehicle, trailer hitch plugs can be difficult to locate in dark conditions.

SUMMARY OF THE INVENTION

According to one aspect of the present invention, a trailer hitch plug is provided. A base member is configured to luminesce in response to excitation light provided by a light source. An electrical connector is provided at the base member. A cover is removably coupled to the electrical connector and configured to luminesce in response to excitation light provided by the light source.

According to another aspect of the present invention, a trailer hitch plug is provided. The trailer hitch plug includes a base member and at least one electrical connector provided at the base member. At least one cover is pivotally coupled to the base member and is movable between an open position and a closed position. The at least one cover has a portion configured to luminesce in response to excitation light provided by a light source.

According to yet another aspect of the present invention, a vehicle system is provided. A license plate is disposed in a license plate compartment. A license plate lamp illuminates the license plate compartment. A trailer hitch plug is disposed in the license plate compartment proximate the license plate and is configured to luminesce in response to excitation light provided by the license plate lamp.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a front view of the trailer hitch plug shown in FIG. 4;

FIG. 6 is a side view of the trailer hitch plug shown in FIG. 4;

FIG. 7 is another side view of the trailer hitch plug shown in FIG. 4;

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
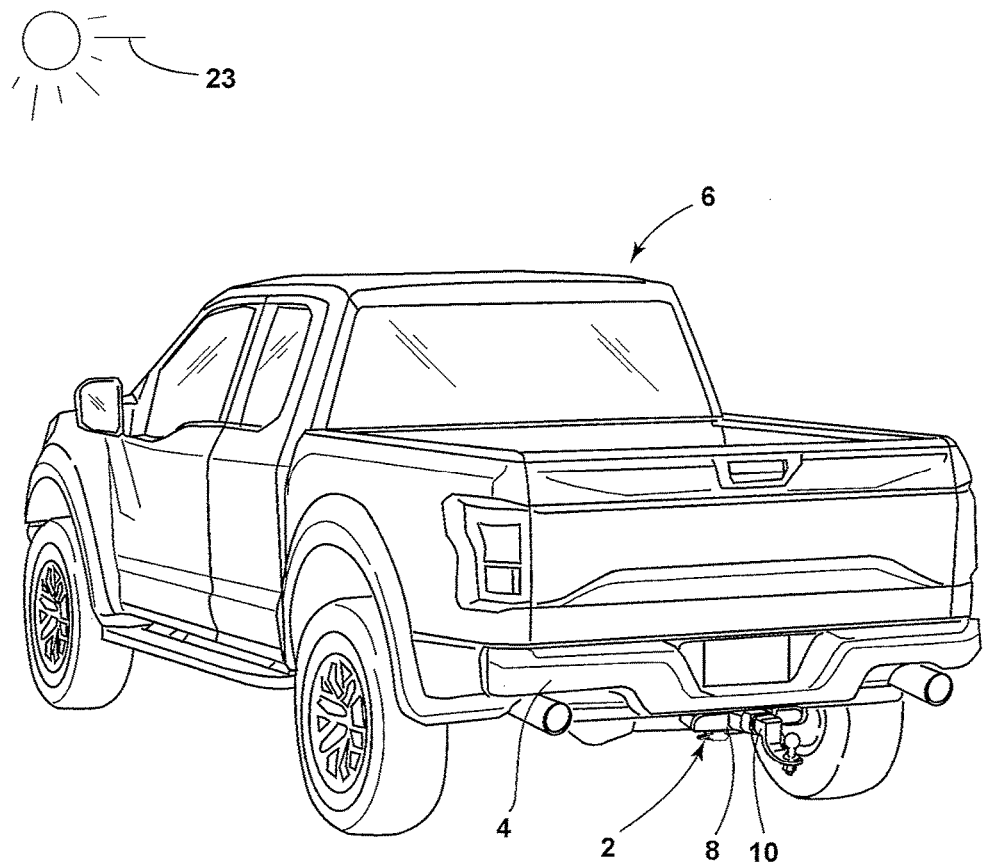
FIG. 1 is a rear perspective view of a vehicle equipped with a trailer hitch plug according to one embodiment.
Figure 2:
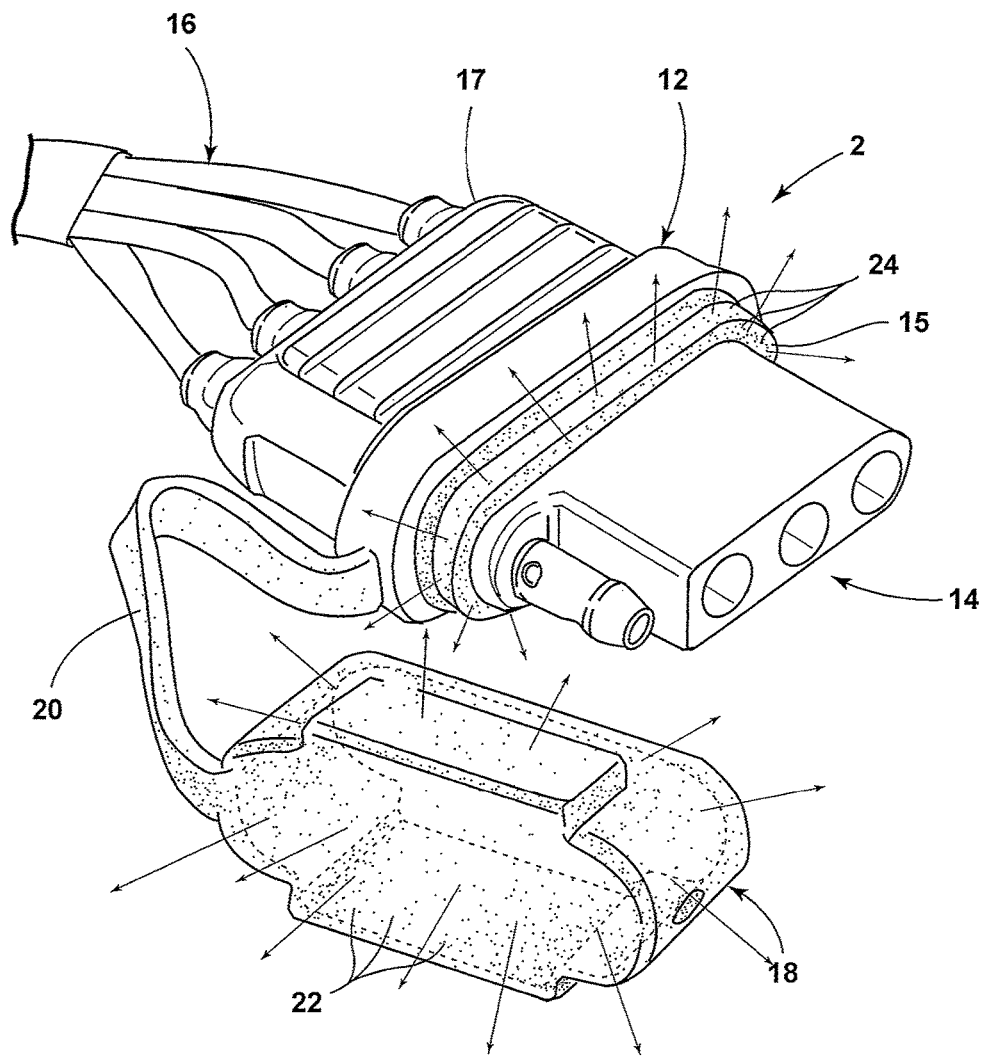
FIG. 2 is a side elevational view of the trailer hitch plug shown in FIG. 1.

Referring to FIGS. 1 and 2, a trailer hitch plug 2 is shown according to one embodiment. As shown in FIG. 1, the trailer hitch plug 2 may be located below a rear bumper 4 of a vehicle 6, which is generally depicted as a pickup truck, but may otherwise be configured as another vehicle type. As depicted in FIG. 1, the trailer hitch plug 2 is exemplarily mounted to an undercarriage 8 of the vehicle 6 and is offset from a trailer hitch 10. As depicted in FIG. 2, the trailer hitch plug 2 is configured as a 4-way flat plug having a base member 12 and an electrical connector 14 that is provided at one end 15 of the base member 12 and is electrically coupled to electrical leads 16 provided at the other end 17 of the base member 12. The trailer hitch plug 2 also includes a cover 18 that is removably coupled to the electrical connector 14 and is connected to the base member 12 via a tether 20. When coupled to the electrical connector 14, the cover 18 generally seals the electrical connector 14 and serves to protect the same from environmental elements. In operation, the electrical connector 14 receives a complimentary connector of a trailer such that electrical power can be supplied from the vehicle 6 to various trailer components. However, due to its location on the vehicle 6, the trailer hitch plug 2 can be difficult to locate, especially in dark environments. Recognizing this problem, the trailer hitch plug 2, according to the embodiments described herein, is configured to illuminate to provide visual indication of its whereabouts relative the vehicle 6. Advantageously, as described herein, the trailer hitch plug 2 may illuminate for sustained periods of time without the need of electrical connection.

In the depicted embodiment, the cover 18 is substantially light-transmissive and may be injection molded from an optically clear silicone. A photoluminescent material 22 may be added during the injection molding process thereby providing luminescent qualities to the cover 18. In operation, the cover 18 luminesces in response to excitation light provided by a light source, which may include natural light (e.g., sunlight 23, FIG. 1) or other light sources external to the vehicle 6 or otherwise mounted thereon. In alternative embodiments, the cover 18 may be opaque and the photoluminescent material 22 may be applied onto one or more exterior surfaces of the cover 18 via flexography or other known deposition processes. Additionally or alternatively, a photoluminescent material may be applied to or otherwise integrated with portions of the base member 12 that are visible to onlookers when the trailer hitch plug 2 is mounted to the vehicle 6. For example, a photoluminescent material 24 may be provided at end 15 of the base member 12 and luminesces in response to excitation light provided by the light source, as generally represented by light rays stemming therefrom. In operation, the excitation light may be directly provided to the photoluminescent material 24 (i.e., when the cover 18 is removed from the electrical connector 14) or is transmitted thereto through the cover 18. It is contemplated that the photoluminescent materials 22, 24 may luminesce in the same or different colors, thereby not only assisting a user in locating the trailer hitch plug 2, but also imparting a stylistic element to the vehicle 6.

According to one embodiment, the photoluminescent materials 22, 24 may include one or more long-persistence phosphors, which are defined herein as being able to store excitation light and release light gradually, for a period of several minutes or hours, once the excitation light ceases to be provided. The decay time may be defined as the time between the end of excitation and the moment when the light intensity of the photoluminescent materials 22, 24 drop below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art. Accordingly, the photoluminescent materials 22, 24 may be configured to luminesce at or above an intensity of 0.32 mcd/m² after being exposed to the excitation light for a period of 10-30 minutes and may continue to luminesce at or above an intensity of 0.32 mcd/m² for a sustained period of time (e.g., the period may extend 8 hours or longer) after the excitation light ceases to be provided.

The long-persistence phosphors may correspond to alkaline earth aluminates and silicates, for example doped disilicates, or any other compound that is capable of emitting light for a period of time once excitation light is no longer available. The long-persistence phosphors may be doped with one or more ions, which may correspond to rare earth elements, for example, $Eu^{2+}$, $Tb^{3+}$ and/or $Dy^{3}$. According to one embodiment, the formulation of the cover 18 may include long-persistence phosphors in the range of about 5% to about 10% such that sufficient excitation light may be transmitted through the cover 18 in order to excite the photoluminescent material 24 at end 15 of the base member 12. It will be understood that the compositions provided herein are non-limiting examples and any long-persistence phosphors known in the art may be utilized without departing from the teachings provided herein.

Additional information regarding the production of long-persistence photoluminescent structures is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012; U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENCE LUMINESCENCE," issued Feb. 10, 2015, all of which are incorporated herein by reference in their entirety.

Moreover, with respect to the embodiments described herein, it is contemplated that other photoluminescent materials, which do not necessarily exhibit long-persistence qualities, may also be utilized without departing from the teachings provided herein. Such photoluminescent materials may have energy converting elements with phosphorescent or fluorescent properties. For example, the photoluminescent material may include organic or inorganic fluorescent dyes including rylenes, xanthenes, porphyrins, and phthalocyanines, or combinations thereof. Additionally or alternatively, the photoluminescent material may include phosphors from the group of Ce-doped garnets such as YAG:Ce. The photoluminescent material may be formulated to have a Stokes shift resulting in the conversion of visible or non-visible light into visible light having an emission spectrum expressed in a desired color, which may vary. Such photoluminescent material may have a limited persistence (e.g., less than about 10 minutes, less than about 5 minutes, less than about 1 minute or no human perceivable persistence).

Figure 3:
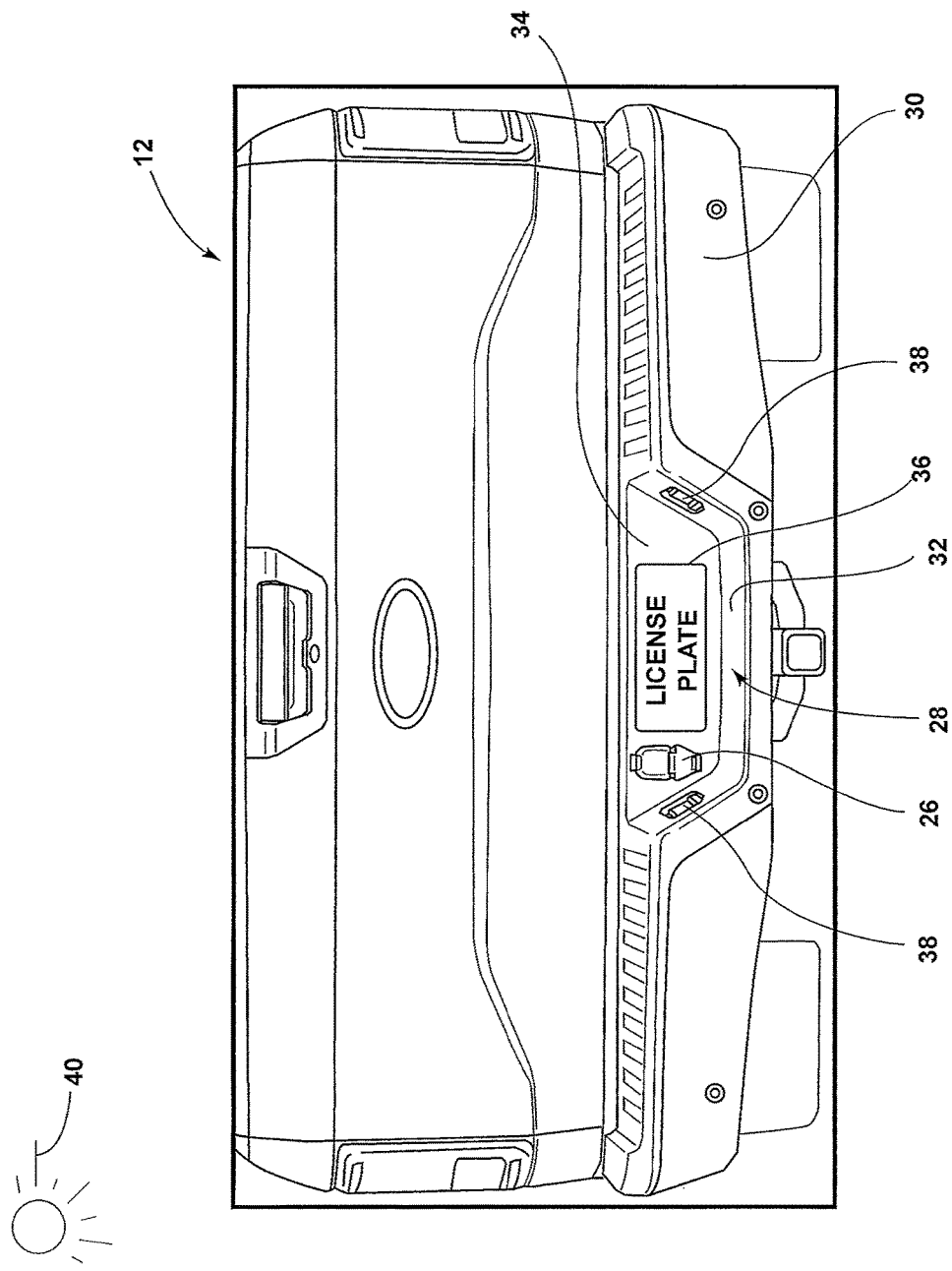
FIG. 3 is another rear view of the vehicle equipped with a trailer hitch plug according to another embodiment.
Figure 4:
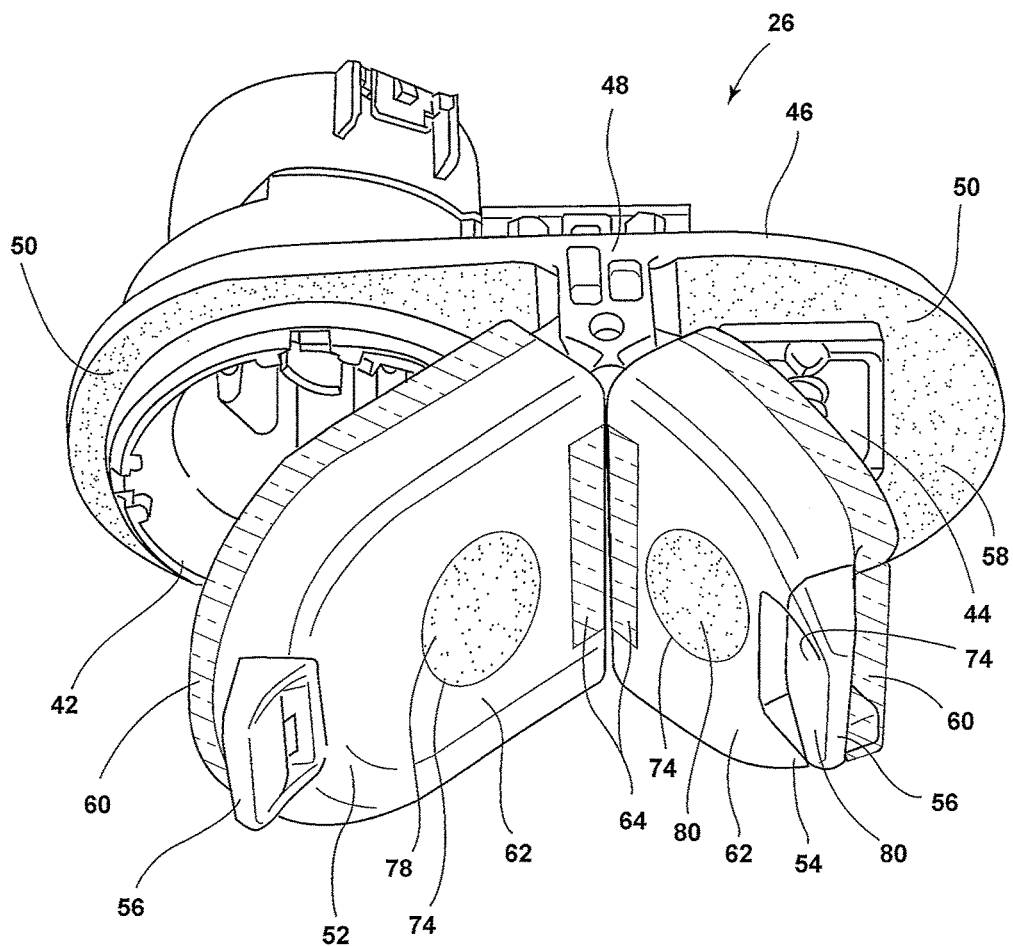
FIG. 4 is front elevational view of the trailer hitch plug shown in FIG. 3.
Figure 9:
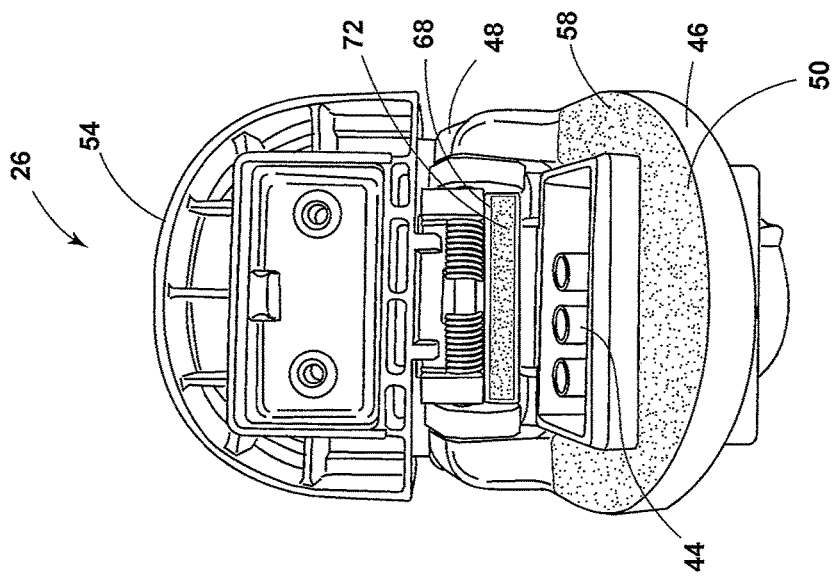
FIG. 9 is a bottom perspective view of the trailer hitch plug shown in FIG. 4, wherein a second cover is opened to expose a second electrical connector.
Figure 8:
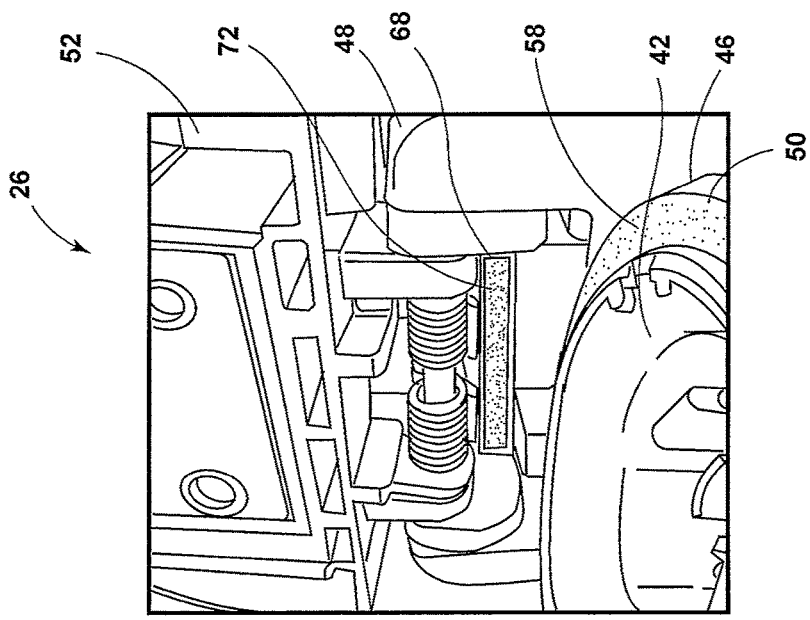
FIG. 8 is a top view perspective view of the trailer hitch plug shown in FIG. 4, wherein a first cover is opened to expose a first electrical connector.

Referring to FIGS. 3-9, a trailer hitch plug 26 is exemplarily shown according to another embodiment. As depicted in FIG. 3, the trailer hitch plug 26 may be located in a license plate compartment 28 provided at the rear of the vehicle 6. The license plate compartment 28 may be formed centrally in a rear bumper assembly 30 of the vehicle 6 and is defined by an open channel 32 that terminates at a back wall 34 of the bumper assembly 30. The trailer hitch plug 26 is mounted to the back wall 34 and is offset from a license plate 36 that is mounted centrally to the back wall 34. A light source, configured as a license plate lamp 38, is provided on each of the side walls of the channel 32 and is configured to illuminate the back wall 34, and particularly, the license plate 36. As will be described further herein, the trailer hitch plug 26 is configured to luminesce in response to excitation light provided the license plate lamp 38 and/or a natural light source such as sunlight 40.

As depicted FIGS. 4-9, the trailer hitch plug 26 is configured as a dual connector having a first electrical connector 42 as a 7-pole, RV-style plug and a second electrical connector 44 configured as a 4-way flat plug, both of which are provided at a base member 46. More specifically, the first electrical connector 42 is provided at an upper half of the base member 46 whereas the second electrical connector 44 is provided at a lower half of the base member 46. The upper and lower halves of the base member 46 are separated by a divider 48 that is raised off a front face 50 of the base member 46 and is located between the first and second electrical connectors 42, 44. A first cover 52 is pivotally coupled to the divider 48 and is movable between an open position granting access to the first electrical connector 42 and a closed position covering the first electrical connector 42 and sealing the same from environmental elements. Similarly, a second cover 54 is pivotally coupled to the divider 48 and is movable between an open position granting access to the second electrical connector 44 and a closed position covering the second electrical connector 44 and sealing the same from environmental elements. Movement of the first and second covers 52, 54 between the open and closed positions may occur via physical manipulation of a tab 56 provided on each of the first and second covers 52, 54. As is known in the art, the first and second covers 52, 54 may be spring-biased to one of the open and closed positions, typically the closed position.

In the depicted embodiment, at least a portion (e.g., front face 50) of the base member 46 is configured to luminesce in response to excitation light provided by a light source such as the license plate lamp 38 and/or sunlight 40. It is contemplated that the license plate lamp 38 may emit light in a white color or other color if desired. According to one embodiment, the license plate lamp 38 includes one or more light emitting diodes (LEDs) that are skewed toward cool white, which is generally characterized as having a correlated color temperature (CCT) of between 4500K and 10000K. Accordingly, it is to be understood that the one or more photoluminescent materials 58 may include a first photoluminescent material configured to excite in response to sunlight 40 and a second photoluminescent material configured to excite in response to light emitted by the license plate lamp 38. In assembly, the base member 46 may be molded from a polymer containing one or photoluminescent materials 58, which may include long-persistence phosphors ranging from 0.1 to 25% in composition. Alternatively, the base member 46 may be molded from an amorphous nylon, a polyphthalamide (PPA), or a poly (methyl methacrylate) (PMMA) acrylic. Alternatively still, the one or more photoluminescent materials 58 may be applied to the front face 50 (or other portions) of the base member 46 via any known deposition process such as painting, flexography, and the like.

The first and second covers 52, 54 may each be molded from a polymer or other suitable material and each include a light-transmissive peripheral portion 60 formed during a second shot of the molding process and provided to transmit excitation light to the one or more photoluminescent materials 58 at the front face 50 of the base member 46 when the first and second covers 52, 54 are in the closed position, respectively. Additionally or alternatively, a front face 62 of the first and second covers 52, 54 includes a light-transmissive portion 64, which can be formed during a second shot of the molding process and transmits excitation light to a corresponding portion 66, 68 of the divider 48 when the first and second covers 52, 54 are in the closed position, respectively. Portions 66 and 68 of the divider 48 each include one or more photoluminescent materials 70, 72, which may include long-persistence phosphors molded therein or otherwise applied thereto. Portions 66 and 68 correspond to opposing side walls of the divider 48 and are each configured to luminesce in response to excitation light provided by the license plate lamp 38 and/or sunlight 40. Luminescent light emitted from portion 66 is directed towards the first electrical connector 42 whereas luminescent light emitted from portion 68 is directed toward the second electrical connector 44. Additionally or alternatively, a substantially central portion 74 of the front face 62 of the first and second covers 52, 54 includes one or more photoluminescent materials 78, 80, which may include long-persistence phosphors molded therein or otherwise applied thereto, and is configured to luminesce in response to excitation light provided by the license plate lamp 38 and/or sunlight 40 when the first and second covers 52, 54 are in the closed position. The photoluminescent materials 78, 80 may be provided at the central portion 74 so as to define an image, lettering, icon, or the like.

In operation, the one or more photoluminescent materials 58, 70, 72, 78, 80 described herein with respect to the present embodiment may each luminesce in the same or different colors and are formulated to be responsive to excitation light provided by the license plate lamp 38 and/or sunlight 40. By using long-persistence phosphors, the corresponding portions of the trailer hitch plug 26 may continue to luminesce for a sustained period of time after the excitation light cease to be provided. The luminescence exhibited by the trailer hitch plug 26 serves the dual purposing of assisting a user in visually locating the trailer hitch plug 26 in dark conditions and imparting a stylistic element to the vehicle 6. While the trailer hitch plug 26 has been described as having certain portions that are configured to luminesce, it should be appreciated that virtually any surface of the trailer hitch plug 26 may be made to luminesce according to the teachings provided herein.

For the purposes of describing and defining the present teachings, it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A trailer hitch plug comprising:
   a base member of the trailer hitch plug configured to photoluminesce in response to excitation light provided by a light source;
   an electrical connector provided at the base member; and
   a cover removably coupled to the electrical connector and configured to photoluminesce in response to excitation light provided by the light source.

2. The trailer hitch plug of claim 1, configured as a 4-way flat plug.

3. The trailer hitch plug of claim 1, wherein the base member is molded from a resin containing one or more photoluminescent materials.

4. The trailer hitch plug of claim 1, wherein a photoluminescent material is applied over a surface of the base member.

5. The trailer hitch plug of claim 1, wherein the cover is substantially light-transmissive.

6. The trailer hitch plug of claim 1, wherein the cover is molded from an optically clear silicone.

7. The trailer hitch plug of claim 1, wherein the base member and the cover are both configured to continue to luminesce for a time period after the excitation light ceases to be provided by the light source.

8. The trailer hitch plug of claim 1, wherein the light source comprises natural light.

9. A trailer hitch plug comprising:
   a base member of the trailer hitch plug;
   at least one electrical connector provided at the base member; and
   at least one cover pivotally coupled to the base member and movable between an open position and a closed position, the at least one cover having a portion configured to photoluminesce in response to excitation light provided by a light source.

10. The trailer hitch plug of claim 9, configured as a dual connector, wherein the at least one electrical connector comprises a 4-way flat plug and a 7-pole plug.

11. The trailer hitch plug of claim 9, wherein the base member includes a portion configured to luminesce in response to excitation light provided by the light source.

12. The trailer hitch plug of claim 11, wherein the at least one cover includes a light-transmissive portion configured to transmit excitation light to the portion of the base member when the at least one cover is in the closed position.

13. The trailer hitch plug of claim 12, wherein the portion of the base member directs luminescent light toward the at least one electrical connector.

14. The trailer hitch plug of claim 9, wherein the light source comprises at least one of a license plate lamp and sunlight.

15. A vehicle system comprising:
a license plate disposed in a license plate compartment;
a license plate lamp for illuminating the license plate compartment; and
a trailer hitch plug disposed in the license plate compartment proximate the license plate and configured to photoluminesce in response to excitation light provided by the license plate lamp.

16. The vehicle system of claim 15, wherein the trailer hitch plug comprises:
a base member;
at least one electrical connector provided at the base member; and
at least one cover pivotally coupled to the base member and movable between an open position and a closed position, the at least one cover having a portion configured to luminesce in response to excitation light provided by the license plate lamp.

17. The vehicle system of claim 16, wherein the base member includes a portion configured to luminesce in response to excitation light provided by the license plate lamp.

18. The vehicle system of claim 17, wherein the at least one cover includes a light-transmissive portion configured to transmit excitation light to the portion of the base member when the at least one cover is in the closed position.

19. The vehicle system of claim 17, wherein the portion of the base member directs luminescent light toward the at least one electrical connector.

20. The vehicle system of claim 15, wherein trailer hitch plug is further configured to luminesce in response to excitation light provided by natural light.

* * * * *